United States Patent
Tracht et al.

(10) Patent No.: US 8,463,952 B1
(45) Date of Patent: Jun. 11, 2013

(54) DEVICE CONNECTIONS AND METHODS THEREOF

(75) Inventors: Allen E. Tracht, Pittsburgh, PA (US); Daniel J. Kolor, Cranberry Township, PA (US); W. Leo Rollins, Cheswick, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/198,641

(22) Filed: Aug. 4, 2011

(51) Int. Cl.
*G06F 11/00* (2006.01)
*G06F 3/00* (2006.01)

(52) U.S. Cl.
USPC .................................. 710/14; 710/38; 714/2

(58) Field of Classification Search
USPC ................................................ 710/38; 714/2
See application file for complete search history.

(56) References Cited

U.S. PATENT DOCUMENTS

| | | | |
|---|---|---|---|
| 7,200,108 B2* | 4/2007 | Beer et al. | 370/222 |
| 2006/0080573 A1* | 4/2006 | Biederman et al. | 714/11 |
| 2006/0282639 A1* | 12/2006 | Liu et al. | 711/170 |

OTHER PUBLICATIONS

Sweeney; "Upstream Port Redundancy and Failover for System Interconnect Switches"; Application Note AN-572; Integrated Device Technology, Inc.; pp. 1-4; May 24, 2007.

* cited by examiner

*Primary Examiner* — Ernest Unelus
(74) *Attorney, Agent, or Firm* — Klein, O'Neill & Singh, LLP

(57) ABSTRACT

A first device port and a second device port are connected using a first cable and a second cable. The first device port and the second device port use a divisible number of lanes, X for communication. The first cable uses X' lanes, where X' is less than X. The second cable uses X-X' lanes, where X-X' is also less than X. If the first cable is disconnected or fails, then the second cable is used after a failover operation.

20 Claims, 4 Drawing Sheets

DEVICE CONNECTIONS AND METHODS THEREOF

TECHNICAL FIELD

The present disclosure relates to computing systems.

BACKGROUND

Computing systems typically include several functional components. These components may include a central processing unit (CPU), main memory, input/output ("I/O") devices, and storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computing system with the CPU and main memory is often referred to as a host system.

Host systems communicate with peripheral devices via an interface such as the Peripheral Component Interconnect ("PCI") interface, a local bus standard using parallel data transfer, or the extension of PCI known as PCI-X. More recently, PCI Express (may also be referred to as PCIe), a standard interface incorporating PCI transaction protocols at the logical level, but using serial data transfer at the physical level has been developed to offer better performance than PCI or PCI-X.

PCIe devices may be connected using a PCIe cable. If a cable connecting two PCIe devices is disconnected or fails, the devices are not able to communicate with each other. One conventional solution to handle such a failure is to provide redundant devices that take over the operations of a device impacted by the failed or disconnected cable. This solution is expensive because one has to invest in multiple devices performing the same functionality.

Another solution has been to use multiple PCIe ports between devices. If a connection between two ports fails, then another port pair is used as part of a failover operation. This solution is also undesirable because it uses multiple port pairs for providing failover and hence not very cost-effective. Continuous efforts are being made to provide cost-effective failover solutions for inter-device communication.

SUMMARY

In one embodiment, a first device port and a second device port are connected using a first cable and a second cable. The first device port and the second device port have a divisible number of lanes, (e.g. X) available for communication. The first cable uses a portion of those lanes, say X', where X' is less than X. The second cable uses the remaining X-X' lanes.

During standard operation, both cables appear as a single cable to a system that uses the first device port and the second device port. If one of the cables is disconnected or fails, then the other cable is used for communication after a failover operation. The failover operation includes a reset operation for resetting only the first device port and the second device port to recognize the other cable. This is advantageous because resetting the ports is less complex than resetting the first device and the second device.

The embodiments disclosed herein provide a cost-effective failover solution where instead of using multiple devices or ports, a plurality of cables are used for communication between two ports. If one of the cables fails, then another cable is used for communication.

In another embodiment, a machine implemented method is provided for an operating environment where a first device port and a second device port are connected using a first cable and a second cable. The method includes detecting a loss of communication due to a failure or a disconnect of the first cable and initiating a failover operation to configure the first device port and the second device port to only use the second cable for communication between the first device port and the second device port.

In yet another embodiment, a machine implemented method is provided. The method includes providing a first device port and a second device port for PCI Express based communication, where the first device port and the second device port are connected using a first cable and a second cable that are configured to appear to a system using the first device port and the second device port as a single cable. The method further includes detecting a loss of communication due to a disconnect or a failure of the first cable connecting the first device port and the second device port; and initiating a failover operation to only use the second cable for communication between the first device port and the second device port.

In another embodiment, a machine implemented method is provided. The method includes detecting a loss of communication between a first device port and a second device port communicating with each other using N number of lanes; and initiating a failover operation to configure the first device port and the second device port to communicate with each other using X' number of lanes, where N' is less than N number of lanes.

In yet another embodiment, a system is provided. The system includes a first device port and a second device port connected using a first cable and a second cable that are configured to appear to a computing system using the first device port and the second device port as a single cable. When a loss of communication is detected due to a failure or a disconnect of the first cable, a failover operation is initiated to use the second cable for communication between the first device port and the second device port.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

Figure 1A:
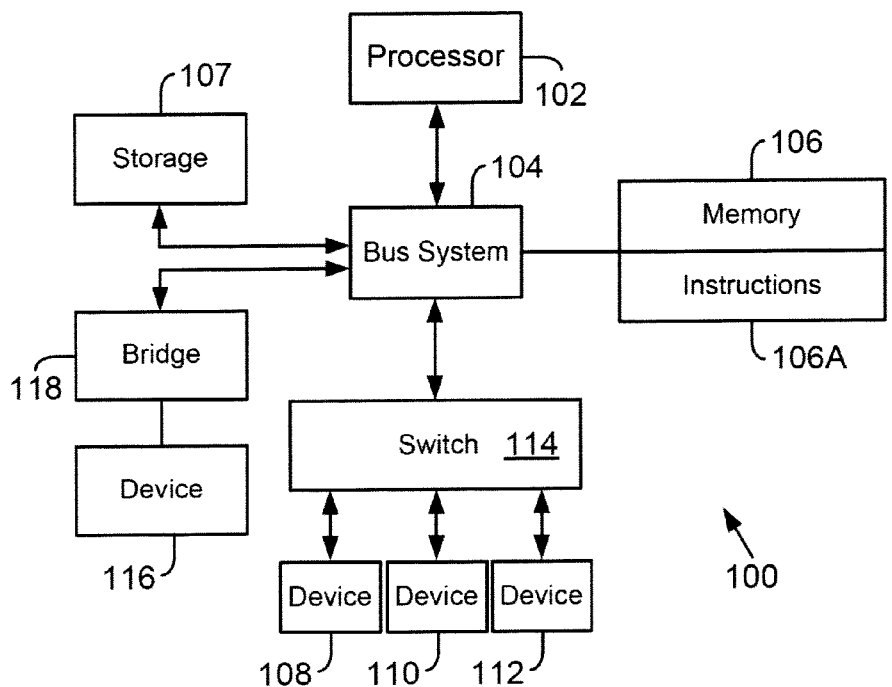
FIG. 1A shows a block diagram of a system using the embodiments disclosed herein.

System:

FIG. 1A shows a block diagram of a system 100, used according to one embodiment. System 100 may include a general-purpose computer, a server connected to other devices via a network connection (not shown), a storage system executing a storage operating system for processing read and write requests or any other type of computing system. Note that certain standard and well-known components of system 100 which are not germane to the present invention are not shown in FIG. 1A.

In one embodiment, system 100 includes one or more processors 102 and memory 106, coupled to a bus system (or interconnect system) 104. Processor 102 is the central processing unit (CPU) of system 100 and thus, controls its overall operation. In certain embodiments, processor 2 may accomplish this by executing programmable instructions (e.g. 106A) stored in memory 106. Processor 102 may be, or may include, one or more programmable general-purpose or special-purpose microprocessors, digital signal processors (DSPs), programmable controllers, application specific integrated circuits (ASICs), state machines, programmable logic devices (PLDs), or the like, or a combination of such hardware devices.

Memory 106 represents any form of random access memory (RAM), read-only memory (ROM), flash memory, or the like, or a combination of such devices. Instructions 106A which implement the process steps of FIGS. 2A-2B may reside in memory 106 and may be executed by processor 102 from memory 106.

Also connected to the processor 102 through the bus system 104 are one or more internal mass storage device for storing data files, programs, applications or any other type of information or computer-executable code. Processor 102 may read code from storage device 107 and execute it out memory 106. Storage device 107 may be or may include any conventional medium for storing data, such as conventional magnetic disks, optical disks such as CD-ROM or DVD based storage, magneto-optical (MO) storage, or any other type of non-volatile storage devices suitable for storing data.

System 100 may also include a network adapter (not shown) to communicate with remote devices (e.g., storage servers) over a network and may be, for example, an Ethernet adapter, a Fibre Channel adapter, or the like. The processing system 100 may also include one or more standard input/output (I/O) devices (not shown) coupled to the bus system 104. The I/O devices may include, for example, a display device, a keyboard, a mouse, etc.

The bus system 104 is an abstraction that represents any one or more separate physical buses and/or point-to-point connections, connected by appropriate bridges, adapters and/or controllers. As an example, the bus system 104 may be or may include a root complex per the PCIe standard. Bus system 104 may also be referred to as root complex 104 throughout this specification. The term root complex is defined by the PCIe standard as an entity that may include a bridge and one or more root ports for interconnecting devices. The bridge connects a processor (e.g. 102) to a hierarchy; where the hierarchy is a tree-like structure of a PCIe topology.

As an example, root complex 104 is coupled to a bridge 118 that allows processor 102 to access a PCI (or PCI-X) device 116. Root complex 104 may also coupled to a standard PCIe switch (may be referred to as "switch") 114 that is coupled to PCIe devices 108-110. Processor 102 can communicate with any of the devices 108-110 via switch 114. Devices 108-110 may include network adapters, storage adapters, converged storage adapters, I/O devices, PCIe switches connected to other devices, and other device types.

Figure 1B:
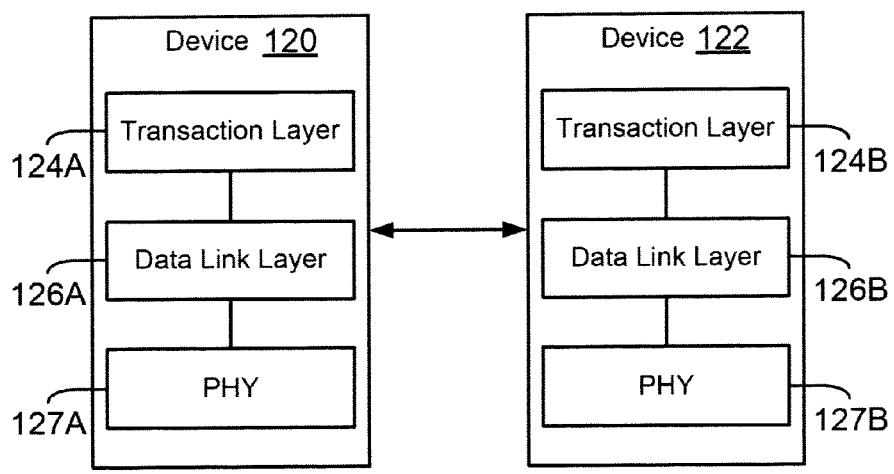
FIGS. 1B-1C show conventional connections between PCIe devices.

PCIe devices typically use discrete logical layers in a layered structure to process information. An example of the layered structure is shown in FIG. 1B where PCIe devices 120 and 122 (may also be referred to as devices 120 and 122) send and receive information using logical layers. The logical layers include Transaction Layers 124A and 124B, Data Link Layers ("DLL") 126A and 126B and Physical Layers ("PHY") 127A and 127B. DLL 126A and 126B serve as intermediate layers between PHY layers 127A and 127B and Transaction Layers 124A and 124B, respectively.

Devices 120 and 122 use a packet-based protocol defined by the PCIe standard to exchange information between the Transaction Layers 124A and 124B. Transactions are carried out using requests and completions. Completions are used, for example, to return read data or to indicate completion of an input/output (I/O) operation.

As an example, device 120 transmits information via PHY 127A to device 122 using Transaction Layer Packets ("TLPs"). The TLPs may be used to communicate transactions, such as read and write operations and other type of events/operations. The TLPs are initially processed by the PHY layer 127B at device 122 and then sent to the Transaction Layer 124B for further processing.

Figure 1C:
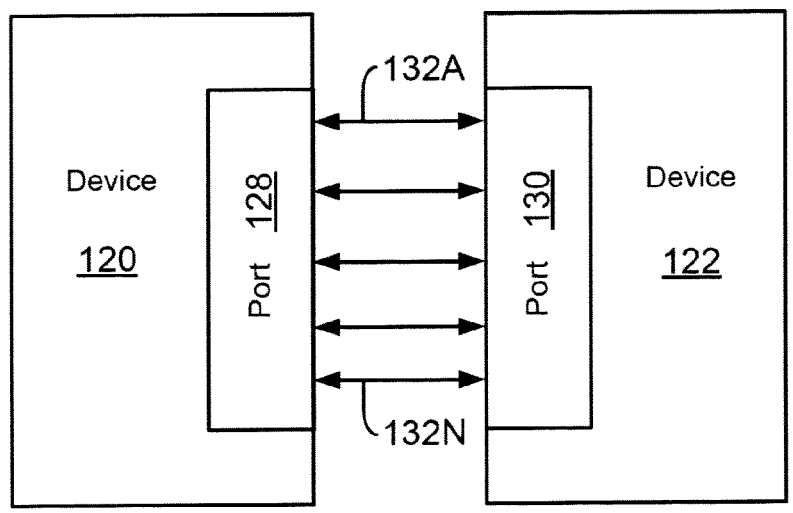

FIG. 1C shows devices 120 and 122 communicating via ports 128 and 130. Port 128 is located at device 120 and port 130 is located at device 122. Ports 128 and 130 include logic and circuitry to receive and transmit a TLP.

Devices 120 and 122 communicate with each other using lanes 132A-132N. A lane, as defined by the PCIe standard, is comprised of a transmit pair and receive pair of differential signals. Each lane includes 4 wires or signal paths for simultaneously, bi-directionally transporting data packets in a 8 bit 'byte' format, between endpoints (for example, devices 120 and 122) of a link.

The PCIe standard provides for standard lane configurations that may include one to thirty-two lanes between communicating devices. For example, devices 120 and 122 may use one, two, four, eight, sixteen and thirty-two lane configurations for communication. Lane counts are typically represented with an x prefix, for example, x8 represents an eight-lane device (or card/slot), which means that the device is capable of using eight lanes for PCIe based communication.

Typically, a port pair of devices 120 and 122 use a single PCIe cable to communicate with each other. If the cable fails, then the devices are not able to communicate with each other. One solution for such a failure is to provide "failover" devices or port pairs. For example, a system may use two network adapters operating as PCIe devices for failover. When one cable connecting a first network adapter fails, then the second network adapter takes over the operation of the first network adapter, after a standard PCIe reset operation. This solution provides redundancy but is expensive because one has purchase more than one adapter for network communication.

The embodiments disclosed herein provide a cost-effective solution, where instead of using multiple devices, a plurality of cables are used between a port pair for communication between devices. For example, if two PCIe ports have 8 lanes available for communication. Then instead of using one cable for all eight lanes, two cables are used to connect the ports, each cable using four lanes. The system using the devices, however only sees one cable with eight lanes. If one of the cables becomes disconnected or fails, then the ports (or devices) continue to operate using the second cable.

Figure 1D:
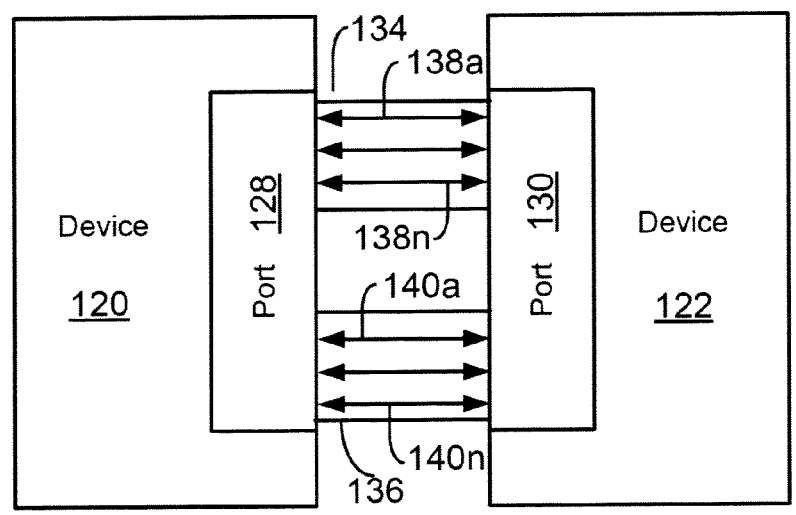
FIG. 1D shows a configuration for connecting PCIe devices, according to one embodiment.

FIG. 1D shows a solution using more than one cable between devices 120 and 122, according to one embodiment. In the solution of FIG. 1D, a first cable 134 with lanes 138a-138n and a second cable 136 with lanes 140a-140n are used to connect devices 120 and 122. During normal operation, i.e., when both cables are operational, all the lanes, i.e. 138a-138n and 140a-140n are used for communication between ports 128 and 130.

If one of the cables is disconnected or fails, then ports 128 and 130 are reset as part of a failover operation. This is advantageous because resetting ports 128 and 130 is less complex than resetting devices 120 and 122. After the reset, only the lanes in the connected/non-defective cable are used for communication between ports 128 and 130.

The foregoing solution does not use additional devices/ports for redundancy and instead uses multiple cables for PCIe connections between standard PCIe ports. This provides a cost-effective failover solution if there is a cable disconnect/failure.

Figure 2A:
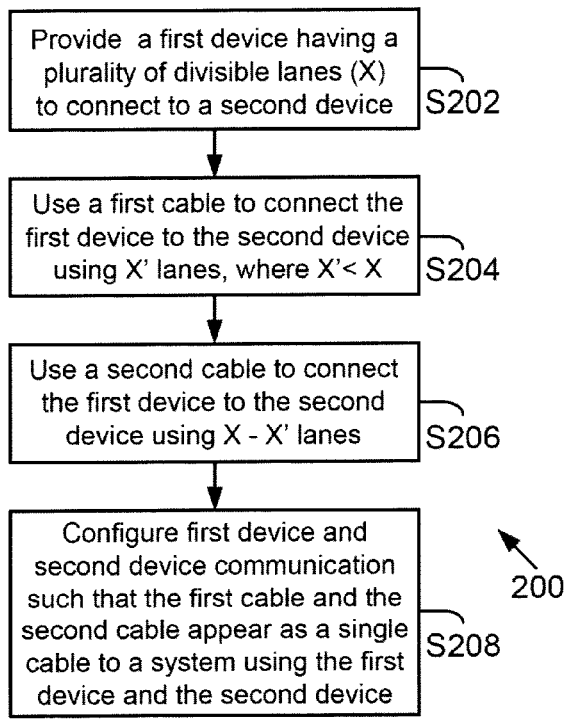
FIGS. 2A-2B show process flow diagrams and FIGS. 3A-3B show examples of connecting devices, according to one embodiment.

FIG. 2A shows a flow diagram of a process 200, according to one embodiment. The process begins in block S202, when a first device (e.g. 120) and a second device (e.g. 122) each having a port (for example, 128 and 130) with a divisible number (for example, X) of lanes are provided for communication. The divisible number of lanes is selected so that more than one cable can be used for connecting a port pair (for example, 128 and 130).

In block S204, a first cable (for example, 134) is used to connect the first device port (128) to the second device port (130) using X' number of lanes. As an example, X may be 8 lanes and X' may be 4 lanes.

In block S206, a second cable (for example, 136) is used to connect ports 128 and 130 using X-X' number of lanes. For example, if X is 8, X' is 4, then X-X' is also 4.

In block S208, the first device and the second device are configured. The configuration is based on the PCIe standard during which the first device port and the second device port communicate with each other using all available lanes between the devices. The first device (or port) and the second device (or port) recognize the available lanes and do not differentiate between the first and the second cable. Thus, both cables appear to a computing system using the devices as a single cable.

Figure 2B:
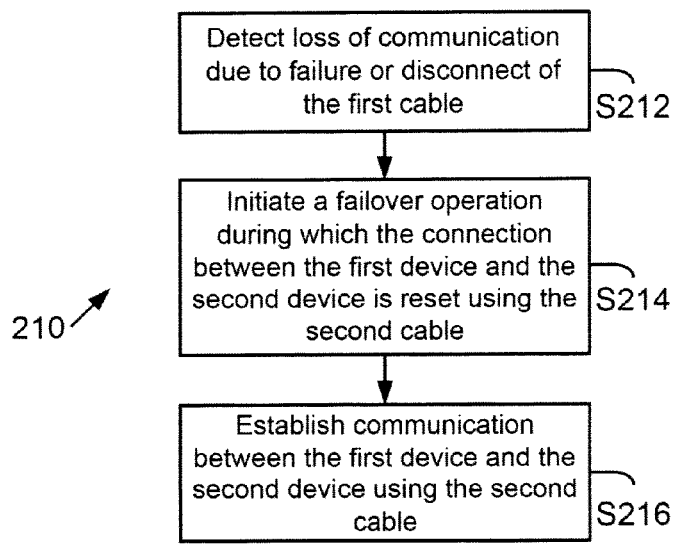

FIG. 2B shows a flow diagram of a process 210 for handling failover, according to one embodiment. The process begins in block S212, when a loss of communication is detected at a port of the first device. As an example, the loss of communication may be because the first cable 134 may have been disconnected or failed.

In block S214, a failover operation is initiated. During failover, a reset operation as described by the PCIe standard is executed for ports 128 and 130. During the reset operation, ports 128 and 130 detect and identify only the lanes available using the second cable. This restores connection between ports 128 and 130 using just the second cable and half the available lanes. Thereafter, in block S216, the two ports communicate using the second cable.

It is noteworthy that although the foregoing example is based on failure of the first cable 134, the inventive embodiments are applicable to either cable (i.e. 134 or 136) failure. Furthermore, more than two cables may be used for connecting ports 128 and 130 and the process described above is applicable to failure of more than one cable i.e. if 3 cables are used and two of them fail, then the third cable may be used after the failover process of FIG. 2B.

In another embodiment, a machine implemented method is provided. The method includes detecting a loss of communication between a first device port (128) and a second device port (130) communicating with each other using N number of lanes, for example, 2, 4, 16 or 32. The N number of lanes may be split between two cables, 134 and 136. A failover operation is initiated to configure the first device port and the second device port to communicate with each other using N' number of lanes, where N' is less than N number of lanes.

Figure 3A:
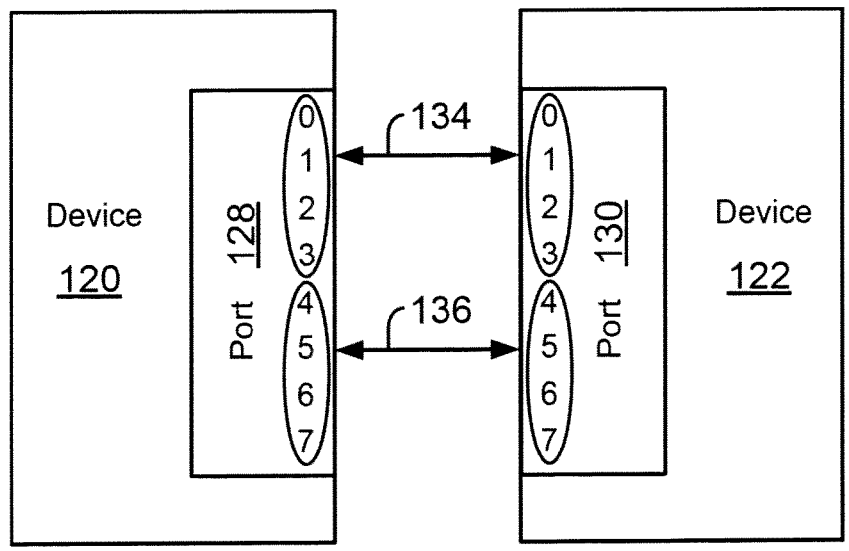
Figure 3B:
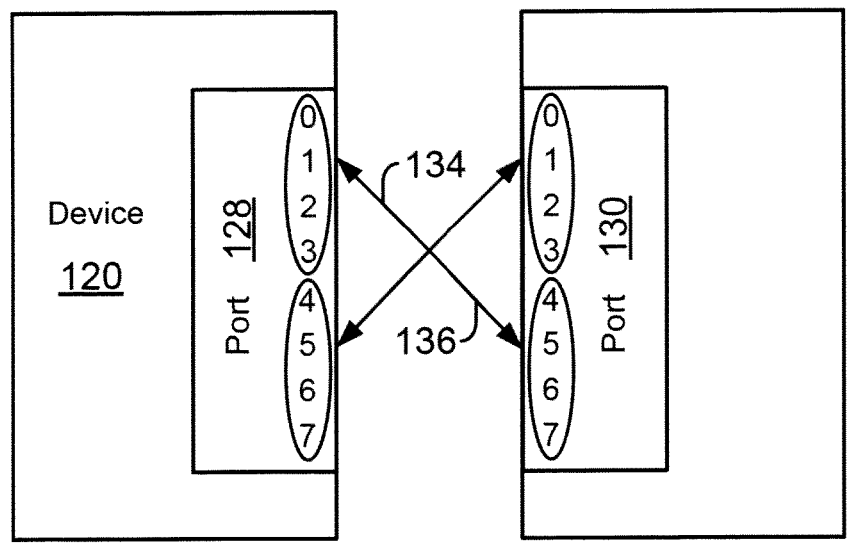

FIGS. 3A-3B show an example of connecting PCIe devices with eight lanes each and using more than one cable. In FIG. 3A, devices 120 and 122 each have eight lanes labeled as 0123 (low lanes) and 4567 (high lanes). Cable 134 is used for a low lane to a low lane connection and cable 136 is used for a high lane to a high lane connection. In FIG. 3B, cable 134 is used for a low lane to a high lane connection and cable 136 is used for a high lane to a low lane connection. It is noteworthy that the examples of FIGS. 3A-3B are illustrative and not meant limit the embodiments.

The embodiments described above provide a cost-effective failover solution where multiple cables are used for reliable communication between PCIe devices. It is noteworthy that although the examples described above are based on the PCIe bus standard, the embodiments are not limited to PCIe devices/topology. The system and methods described herein may be used in any other standard/non-standard topology, where multiple lanes are available for inter-device communication and more than one cable can be used to connect devices.

Thus, a method and apparatus connecting devices has been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodi-

What is claimed is:

1. A machine implemented method, comprising:
a processor detecting a loss of redundant communication due to a failure or a disconnect of a first cable directly connecting a first device port and a second device port; wherein the first device port and the second device port are connected using the first cable and a second cable; and
the processor initiating a failover operation to re-configure only the first device port and the second device port to only use the second cable for communication between the first device port and the second device port.

2. The method of claim 1, wherein the first device port and the second device port are peripheral component interconnect (PCI) Express ports.

3. The method of claim 2, wherein the first device port and the second device port use a divisible number of lanes for communication.

4. The method of claim 3, wherein the first device port and the second device port use two lanes for communication.

5. The method of claim 3, wherein the first device port and the second device port use four lanes for communication.

6. The method of claim 3, wherein the first device port and the second device port use eight lanes for communication.

7. The method of claim 3, wherein the first device port and the second device port use sixteen lanes for communication.

8. The method of claim 3, wherein the first device port and the second device port use thirty-two lanes for communication.

9. A machine implemented method, comprising:
providing a first device port and a second device port for peripheral component interconnect (PCI) Express based communication; wherein the first device port and the second device port are directly connected using a first cable and a second cable that are configured to appear to a system using the first device port and the second device port as a single cable;
a processor detecting a loss of redundant communication due to a disconnect or a failure of the first cable connecting the first device port and the second device port; and
the processor initiating a failover operation to only use the second cable for communication between the first device port and the second device port after only the first device port and the second device port are re-configured.

10. The method of claim 9, wherein the first device port and the second device port are peripheral component interconnect (PCI) Express ports.

11. The method of claim 10, wherein the first device port and the second device port use a divisible number of lanes for communication.

12. The method of claim 11, wherein the first device port and the second device port use two lanes for communication.

13. The method of claim 11, wherein the first device port and the second device port use four lanes for communication.

14. The method of claim 11, wherein the first device port and the second device port use eight lanes for communication.

15. The method of claim 11, wherein the first device port and the second device port use sixteen lanes for communication.

16. The method of claim 11, wherein the first device port and the second device port use thirty-two lanes for communication.

17. A system, comprising:
a first device port and a second device port directly connected using a first cable and a second cable that are configured to appear to a computing system using the first device port and the second device port as a single cable; wherein when a loss of communication is detected due to a failure or a disconnect of the first cable, a failover operation is initiated by a processor to re-configure only the first device port and the second device port to only use the second cable for redundant communication between the first device port and the second device port.

18. The system of claim 17, wherein the first device port and the second device port are peripheral component interconnect (PCI) Express ports.

19. The system of claim 18, wherein the first device port and the second device port have a divisible number of lanes available for communication.

20. The system of claim 19, wherein the first device port and the second device port use one or more of two, four, eight, sixteen and thirty-two lanes for communication.

* * * * *